United States Patent
Harashima et al.

(10) Patent No.: US 8,234,610 B2
(45) Date of Patent: Jul. 31, 2012

(54) DESIGN RULE MANAGEMENT METHOD, DESIGN RULE MANAGEMENT PROGRAM, RULE MANAGEMENT APPARATUS, AND RULE VERIFICATION APPARATUS

(75) Inventors: Ichiro Harashima, Ibaraki (JP); Keisuke Nakashima, Ibaraki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/840,718

(22) Filed: Jul. 21, 2010

(65) Prior Publication Data

US 2010/0287523 A1 Nov. 11, 2010

Related U.S. Application Data

(62) Division of application No. 12/016,224, filed on Jan. 18, 2008, now Pat. No. 7,765,505.

(30) Foreign Application Priority Data

Mar. 16, 2007 (JP) .................................. 2007-068974

(51) Int. Cl.
*G06F 17/50* (2006.01)
(52) U.S. Cl. ........... 716/111; 716/136; 716/139; 706/47
(58) Field of Classification Search .................. 716/111, 716/136, 139; 706/47
See application file for complete search history.

(56) References Cited

U.S. PATENT DOCUMENTS

| | | | |
|---|---|---|---|
| 5,493,688 A | 2/1996 | Weingard | |
| 5,537,523 A | 7/1996 | Harashima et al. | |
| 5,701,400 A | 12/1997 | Amado | |
| 5,761,664 A | 6/1998 | Sayah et al. | |
| 6,426,761 B1 | 7/2002 | Kanevsky et al. | |
| 6,453,452 B1 | 9/2002 | Chang et al. | |
| 6,584,608 B1 * | 6/2003 | Kumada et al. | 716/129 |
| 6,601,221 B1 * | 7/2003 | Fairbanks | 716/106 |
| 6,675,155 B2 | 1/2004 | Sasagawa et al. | |
| 7,096,174 B2 | 8/2006 | Beattie et al. | |
| 7,124,382 B1 * | 10/2006 | Eccles et al. | 716/112 |
| 7,280,990 B2 * | 10/2007 | Turner et al. | 706/45 |
| 7,383,529 B2 | 6/2008 | Gupta et al. | |
| 7,555,733 B1 | 6/2009 | Gee et al. | |
| 7,571,405 B1 * | 8/2009 | Aik | 716/107 |

(Continued)

OTHER PUBLICATIONS

Kazuhiro Aoyama, et al., "Proposition of Product Behavior and Topology Design Process Model for Reliability Design System", pp. 1-4, Year pub. 2003.

*Primary Examiner* — Naum Levin
(74) *Attorney, Agent, or Firm* — Antonelli, Terry, Stout & Kraus, LLP.

(57) ABSTRACT

A design rule management method implemented in a rule verification apparatus for checking a violation against a design rule which specifies a part shape when there is any change in parameters in a system, the rule verification apparatus including: a processing unit for processing information; an input unit for inputting information; and a storage unit for storing a first design rule, a second design rule and relationship strength therebetween in association with one another, the method allowing the processing unit to perform steps including: acquiring the changed parameter via the input unit; and in a rule verification to determine whether or not there is any violation in the design rules that use the changed parameter, acquiring from the storage unit all the design rules having the relationship strength of a predetermined value, and performing the rule verification on all the acquired design rules.

7 Claims, 8 Drawing Sheets

U.S. PATENT DOCUMENTS

| | | |
|---|---|---|
| 2003/0069722 A1 | 4/2003 | Beattie et al. |
| 2004/0215626 A1 | 10/2004 | Colossi et al. |
| 2005/0183052 A1 | 8/2005 | Ash-Rafzadeh |
| 2005/0188336 A1 | 8/2005 | Mortensen et al. |
| 2005/0229136 A1 | 10/2005 | Yuda et al. |
| 2006/0178862 A1 | 8/2006 | Chan et al. |
| 2006/0265675 A1* | 11/2006 | Wang ................................ 716/5 |
| 2006/0265678 A1 | 11/2006 | Okabe |
| 2007/0005658 A1 | 1/2007 | Myllymaki |
| 2008/0005713 A1 | 1/2008 | Singh et al. |
| 2008/0033710 A1* | 2/2008 | Turner et al. .................... 703/27 |
| 2008/0077259 A1* | 3/2008 | Furumoto ........................ 700/90 |
| 2008/0079729 A1* | 4/2008 | Brailovsky .................... 345/443 |

* cited by examiner ly the same as
DESIGN RULE MANAGEMENT METHOD, DESIGN RULE MANAGEMENT PROGRAM, RULE MANAGEMENT APPARATUS, AND RULE VERIFICATION APPARATUS

CROSS REFERENCE TO RELATED APPLICATIONS

This is a divisional of U.S. application Ser. No. 12/016,224, filed Jan. 18, 2008 (now U.S. Pat. No. 7,765,505. This application relates to and claims priority from Japanese Patent Application No. 2007-068974, filed on Mar. 16, 2007. The entirety of the contents and subject matter of all of the above is incorporated herein by reference.

BACKGROUND OF THE INVENTION

1. Field of the Invention

The present invention relates to a design rule management method, design rule management program, rule management apparatus and rule verification apparatus.

2. Description of the Related Art

Design rules (hereinafter also referred to as just "rules" when necessary) are often used in designing with a CAD system (Computer Aided Design). The design rules are information composed of (including) a sort of conditions and relational expressions for determining a design parameter (hereinafter also referred to just as a "parameter" when necessary) which specifies a shape of each part. For example, the design rules are a condition which regulates an interval of components and a condition of a width of wiring.

When a shape of a part is changed on the CAD system, a rule verification is performed for checking whether or not a part-shape parameter, which is one of parameters which are being changed, violates a design rule.

As an example of the rule verification method for checking whether or not parameters necessary for a product designing violates a rule, in some commercially-supplied CAD systems, allowable ranges of mass property values of shape dimensions and weights are predefined as a rule on the CAD system so that the rule verification is automatically performed when a part shape is changed in the CAD system.

In a CAE (Computer Aided Engineering) system, if allowable ranges of parameters are predefined as a rule in an analysis program, a rule verification is performed on analysis data. A program performing a calculation by using a user interface of a table format and a script, known as a simple analytical calculation tool is also generally used in designing. When such a tool is used, a rule is predefined as a script so that a rule verification is also performed, similar to the above case of the analysis program.

There has been proposed an integrated parameter expression model by a university. For example, a technique disclosed in a non-patent document 1 is capable of expressing a product entity such as a part, its attribute and its activity (task) by linking via networks the product entity, the attribute and the activity which are involved in a product development. Non-patent document 1: "Proposition of Product Behavior and Topology Design Process Model for Reliability Design System," by Kazuhiro Aoyama, Tsuyoshi Koga, Susumu Kinoshita, online: http://www.msel.t.u-tokyo.ac.jp/~tsuyoshi-koga/B5.pdf, (accessed on Mar. 8, 2006)

In a conventional designing of a product, rules are described and managed in an individual system such as a CAD system, an analysis program, an analysis control program and a PDA (Product Data Management), and a rule verification is performed in each system. The conventional method has had the following disadvantages.

1. Each rule is only valid in its corresponding system, and thus it is difficult to describe and check a rule through the entire design data of those systems.

2. The rules are treated as different data in a different system, and thus it is difficult to maintain the rules through the systems.

The following is a specific example of the disadvantage 1. It is assumed that a rule "the size a11 of the part A >10 mm" is assigned to a product shape which has been modeled by a CAD system and the fixed number "10 mm" is based on an analysis parameter which is one of parameters resulted from an analysis of a different analysis program. In this case, a rule using such a fixed number is not available anymore when a design target or a design condition are once changed, which makes the rule incompatible. More specifically, because a rule used in a CAD system and a rule used in an analysis program are treated as different data in each other, a result from a condition change in the analysis program becomes difficult to be reflected in the CAD system for example.

Moreover, when it is necessary to modify a rule that has been deviated from an actual design target and design condition because of the disadvantage 1, the disadvantage 2 has further to be resolved. Because of these disadvantages, a rule verification system may not work properly after the rules are changed many times. In order to solve the above disadvantages, there has been desired a system that associates a plurality of rules, each of which is described in corresponding design support system, so as to integrally manages the rules and performs a rule verification in chains through the entire systems.

SUMMARY OF THE INVENTION

The present invention is made in view of the above circumstances, and an object of the present invention is to enable to recognize design rules which are substantially the same but written as different design rules in different systems as the same design rule.

The present invention acquires a design rule for regulating a part shape, converts the design rule into data having a hierarchical node format, calculates relationship strength which indicates the strength of a relationship between the design rule which has been converted into the data having the hierarchical node format and another node, assigns a maximum value to the relationship strength between the design rule and another design rule which is substantially the same as the design rule but described in a different system and associates the relationship strength and the design rules and stores the relationship strength and the design rules in a storage unit.

A first aspect of the present invention provides a design rule management method implemented in a rule management apparatus which manages design rules for specifying a part shape and includes a processing unit for processing information; an input unit for inputting information; and a storage unit for storing information, the method allowing the processing unit to perform steps including acquiring a plurality of the design rules via the input unit; converting each of the acquired design rules into data having a hierarchical node format; calculating, for each design rule converted into data having the hierarchical node format, relationship strength indicating strength of a relationship to another node; converting into a predetermined value the relationship strength between a first design rule and a second design rule, and storing in the storage unit the relationship strength, the first design rule and the second design rule in association with one another, wherein the first design rule is arbitrarily chosen from the plurality of the design rules and the second design rule is substantially the same as the first design rule but described in a manner different from that of the first design rule.

A second aspect of the present invention provides a design rule management method implemented in a rule verification apparatus for checking a violation against a design rule which specifies a part shape when there is any change in parameters in a system, the rule verification apparatus including a processing unit for processing information; an input unit for inputting information; and a storage unit for storing a first design rule, a second design rule and relationship strength therebetween in association with one another, the method allowing the processing unit to perform steps including acquiring the changed parameter via the input unit; and in a rule verification to determine whether or not there is any violation in the design rules that use the changed parameter, acquiring from the storage unit all the design rules having the relationship strength of a predetermined value, and performing the rule verification on all the acquired design rules.

A third aspect of the present invention provides a design rule management program recorded in a computer readable recording medium which performs the method according to the first aspect of the present invention.

A fourth aspect of the present invention provides a design rule management program recorded in a computer readable recording medium which performs the method according to the second aspect of the present invention.

A fifth aspect of the present invention provides a rule management apparatus for managing design rules which specify a part shape and include a processing unit for processing information; an input unit for inputting information and a storage unit for storing information, wherein the processing unit acquires a plurality of the design rules via the input unit; converting each of the acquired design rules into data having a hierarchical node format; calculates, for each design rule converted into data having the hierarchical node format, relationship strength indicating strength of a relationship to another node, converts into a predetermined value the relationship strength between a first design rule and a second design rule, and storing in the storage unit the relationship strength, the first design rule and the second design rule in association with one another, wherein the first design rule is arbitrarily chosen from the plurality of the design rules and the second design rule is substantially the same as the first design rule but described in a manner different from that of the first design rule.

A sixth aspect of the present invention provides a rule verification apparatus for checking a violation against a design rule which specifies a part shape when there is any change in parameters in a system, the rule verification apparatus including a processing unit for processing information; an input unit for inputting information; and a storage unit for storing a first design rule, a second design rule and relationship strength therebetween in association with one another, wherein the processing unit acquires the parameter which is changed via the input unit; in a rule verification to determine whether or not there is any violation in the design rules that use the changed parameter, acquires from the storage unit all the design rules having a predetermined value in the relationship strength with the design rule using the acquired parameter, and performs a rule verification on all the acquired design rules.

Other features and advantages of the present invention will become more apparent from the following detailed descriptions of the invention when taken in conjunction with the accompanying drawings.

BRIEF DESCRIPTION OF THE DRAWINGS

FIG. 7 is an example of a rule verification result screen shown at step S305 of FIG. 6;

DETAILED DESCRIPTION OF THE INVENTION

Embodiment for implementing the present invention will be described hereinafter in detail with reference to the accompanying drawings.

Figure 1:
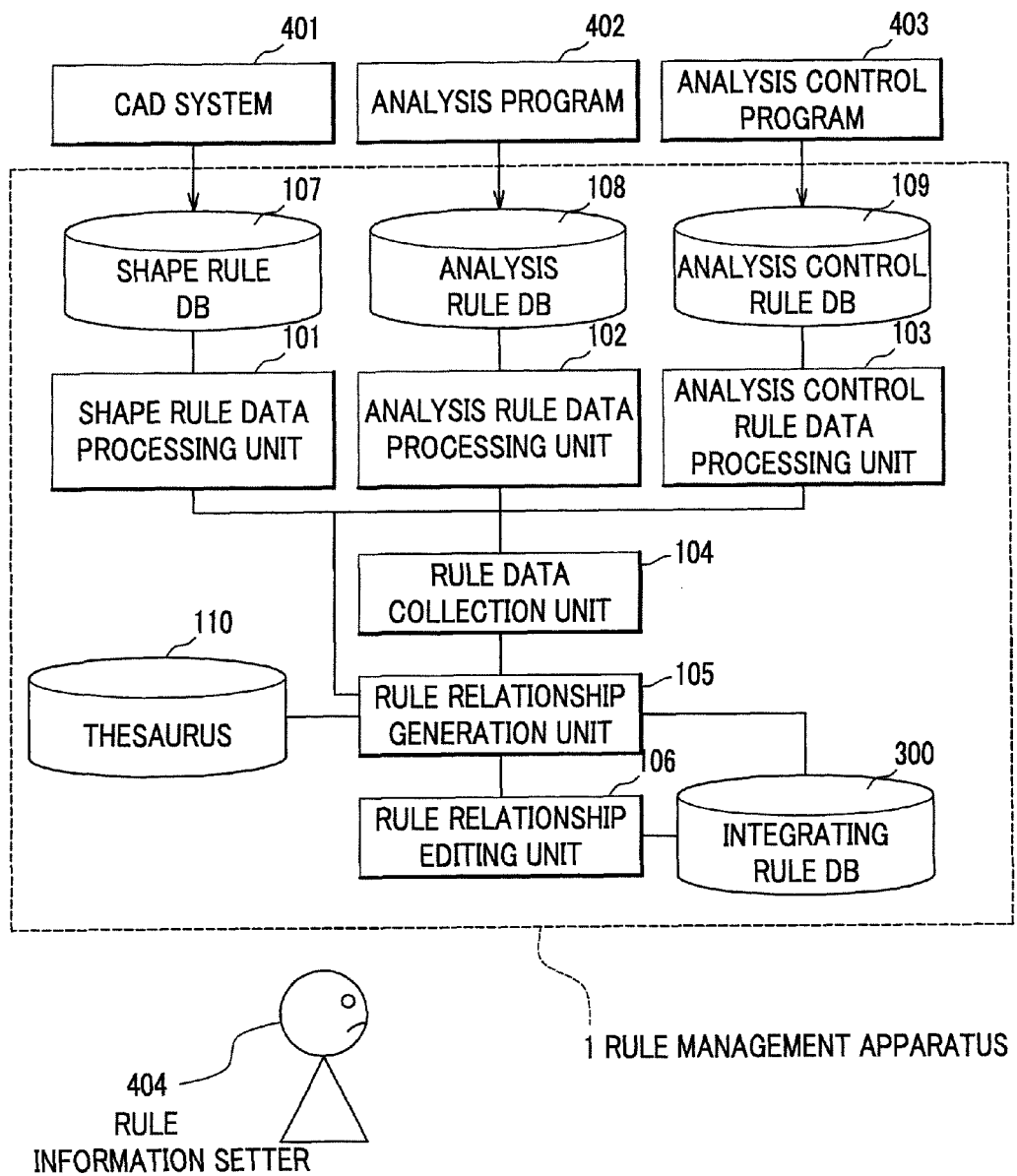
FIG. 1 is an example of a functional block diagram of a rule management apparatus according to an embodiment.

FIG. 1 is an example of a functional block diagram of a rule management apparatus according to the embodiment.

The rule management apparatus 1 includes a shape rule data processing unit 101, an analysis rule data processing unit 102, an analysis control rule data processing unit 103, a rule data collecting unit 104, a rule relationship generation unit 105, a rule relationship editing unit 106, a shape rule DB(Data Base) 107, an analysis rule DB 108, an analysis control rule DB 109, a thesaurus 110 and an integrating rule DB 300.

The shape rule data processing unit 101, the analysis rule data processing unit 102 and an analysis control rule data processing unit 103 are also referred to as "an input unit", the rule data collecting unit 104, the rule relationship generation unit 105 and the rule relationship editing unit 106 are also referred to as "a processing unit". The integrating rule DB 300 is also referred to as "a storage unit".

The shape rule DB107 stores shape rule data sent from the CAD system 401 which deals with a size parameter, a geometric binding relationship and a mass property and the like. The analysis rule DB 108 stores analysis rule data sent from an analysis program 402. The analysis control rule DB 109 stores analysis control rule data sent from an analysis control program 403. The shape rule data, analysis rule data and analysis control rule data include information on a rule name and a rule formula and the like. In the embodiment, the shape rule data, the analysis rule data and the analysis control rule data are collectively called rule data.

The shape rule data processing unit 101 has functions of acquiring shape rule data from the shape rule DB107 and converting the acquired shape rule data into data having a node data format. The node data format is for displaying product data, part data, attribute data and rule data that are related to one another as hierarchical nodes which displays the data hierarchically, which is described later with reference to FIG. 5.

Similarly, the analysis rule data processing unit 102 has functions of acquiring analysis rule data from the analysis rule DB 108 and converting the acquired analysis rule data into data having the node data format. The analysis control rule data processing unit 103 has functions of acquiring analysis control rule data from the analysis control rule DB 109 and converting the acquired analysis control rule data into the node data format.

Node data is formed in a data format including "node type", "node ID", "related node" and "relationship strength". An example of rule node data would be such that the node type is "rule", the node ID is "rule 1", the related node is "rule 2" and the relationship strength is "0.7" (in this embodiment, it is assumed that the maximum value of the relationship strength is 1.0 for the convenience of the explanation).

The node data format can be applied not only to the rule data but also to the product data, the part data and the attribute data.

The rule data collecting unit 104 has a function of acquiring rule node data from the shape rule data processing unit 101, the analysis rule data processing unit 102 and the analysis control rule data processing unit 103.

The rule relationship generation unit 105 has functions that detect a relationship between the rule node data and another node data on the basis of the thesaurus 110 and the like, and store information of the detected relationship in the integrating rule DB 300. A method for detecting the relationship is described later with reference to FIG. 4.

The rule relationship editing unit 106 has functions that display the information of the relationship detected by the rule relationship generation unit 105, and edit the information of the relationship when a rule information setter 404 edits node data via a pointing device such as a mouse not shown.

The integrating rule DB 300 stores information of the relationships between each node data.

The thesaurus 110 stores information of synonyms.

In this embodiment, the units 101 to 106 and the data bases 107 to 110, 300 are incorporated in an integrated apparatus, however, the data bases 107 to 110, 300 may be implemented in a file server other than the rule management apparatus 1.

In this embodiment, the CAD system 401, the analysis program 402, and the analysis control program 403 are implemented in an apparatus other than the rule management apparatus 1, however, at least one of the CAD system 401, the analysis program 402 and the analysis control program 403 may be included in the rule management apparatus 1.

Moreover, the rule management apparatus 1 according to the embodiment may include a PDM rule data processing unit and a PDM rule DB not shown, which stores PDM rule data sent from a PDM system.

Figure 2:
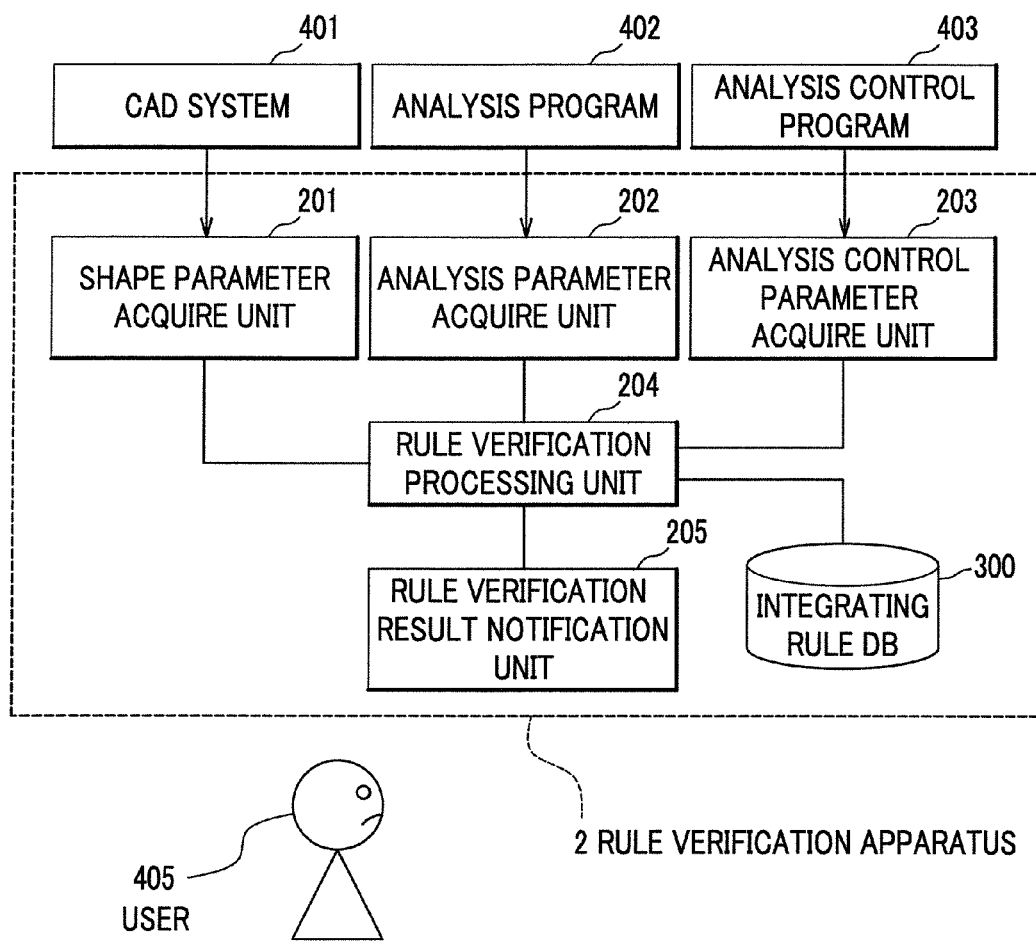
FIG. 2 is an example of a functional block diagram of a rule verification apparatus according to the embodiment.

FIG. 2 is an example of a functional block diagram of a rule verification apparatus according to the embodiment.

In FIG. 2, similar reference numbers are assigned to elements corresponding to the elements shown in FIG. 1, and the description thereof will be omitted.

The rule verification apparatus 2 includes a shape parameter acquire unit 201, an analysis parameter acquire unit 202, an analysis control parameter acquire unit 203, a rule verification processing unit 204, a rule verification result notification unit 205 and the integrating rule DB 300.

The shape parameter acquire unit 201, the analysis parameter acquire unit 202 and the analysis control parameter acquire unit 203 are also referred to as "an input unit". The rule verification processing unit 204 and the rule verification result notification unit 205 are also referred to as "a processing unit". The integrating rule DB 300 is also referred to as "a storage unit".

The shape parameter acquire unit 201 has a function of acquiring a shape parameter which is changed when a user 405 changes CAD data in the CAD system 401.

The analysis parameter acquire unit 202 has a function of acquiring an analysis parameter which is changed when the user 405 changes a condition and executes the analysis program 402.

The analysis control parameter acquire unit 203 has a function of acquiring an analysis control parameter which is changed when the user 405 changes a condition and executes the analysis control program 403.

The rule verification processing unit 204 has a function of performing a rule verification based on each parameter acquired from each acquire unit 201 to 203 and node data acquired from the integrating rule DB 300.

The rule verification result notification unit 205 has a function of notifying the user 405 of a result of the rule verification performed by the rule verification processing unit 204 by displaying the result on a display unit not shown.

In this embodiment, the units 201 to 205 and the integrating rule DB 300 are implemented integrally in an apparatus, however, the implementation is not limited to this, and the integrating rule DB 300 may be implemented in a file server other than the rule verification apparatus 2.

In this embodiment, the CAD system 401, the analysis program 402 and the analysis control program 403 are implemented in an apparatus other than the rule verification apparatus 2, however, the implementation is not limited to this and at least one of the CAD system 401, the analysis program 402 and the analysis control program 403 may be included in the rule verification apparatus 2.

Moreover, the rule verification apparatus 2 according to the embodiment may include a PDM parameter acquire unit for acquiring a PDM parameter which is changed when the user 405 changes a condition and executes a PDM program.

In this embodiment, the rule management apparatus 1 shown in FIG. 1 is implemented in an apparatus other than an apparatus in which the rule verification apparatus 2 shown in FIG. 2 is implemented. However, the implementation is not limited to this, and the rule management apparatus 1 and the rule verification apparatus 2 may be integrally implemented in one apparatus.

Each unit 101 to 106 shown in FIG. 1 and each unit 201 to 205 shown in FIG. 2 is embodied when a program stored in a HD (Hard Disk) and a ROM (Read Only Memory) is expanded on a RAM (Random Access Memory) and is executed by a CPU (Central Processing Unit).

<Process for Rule Relationship Generation>

Figure 3:
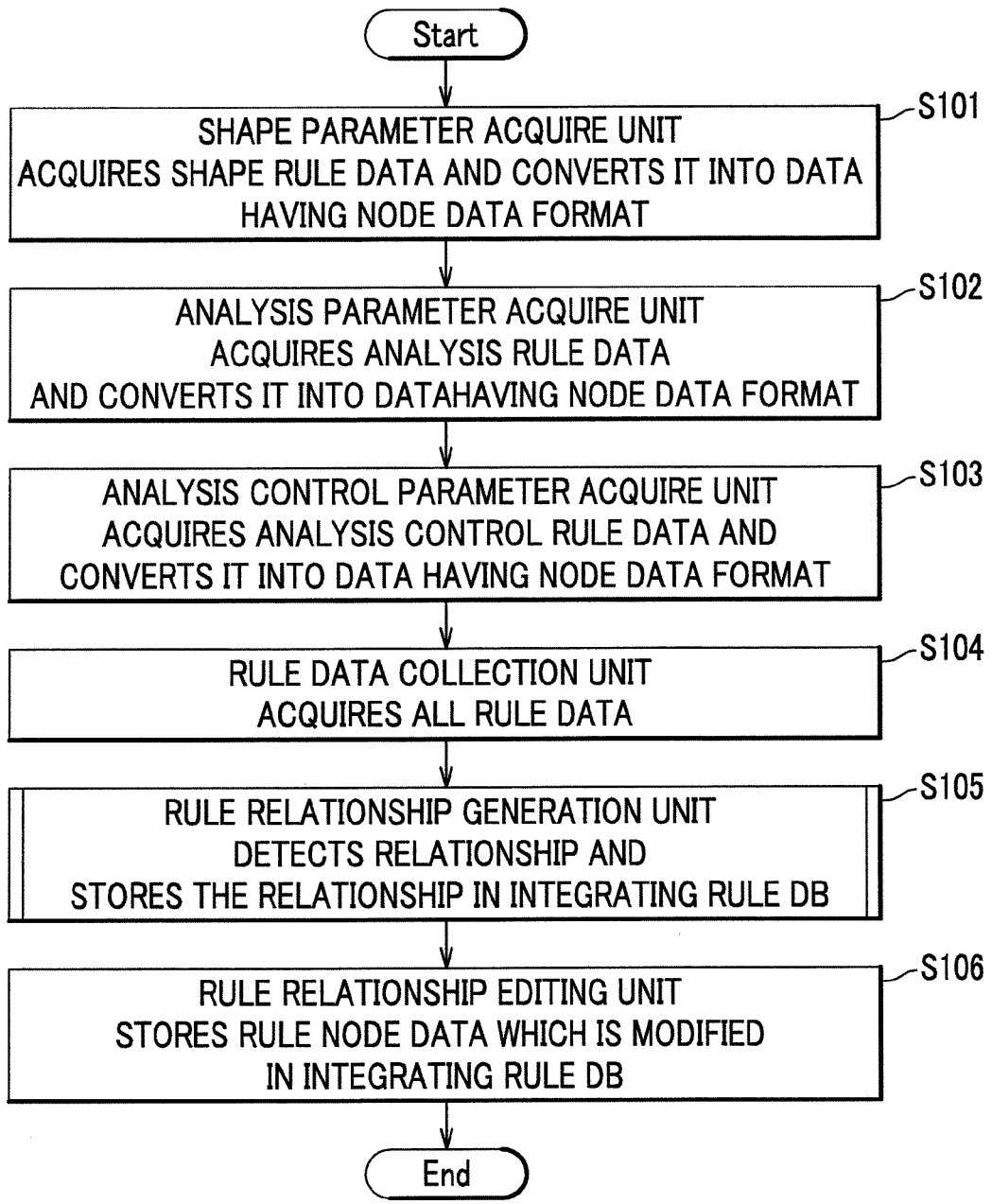
FIG. 3 is a flow chart showing a process in the rule management apparatus according to the embodiment.

FIG. 3 is a flow chart showing a process in the rule management apparatus according to the embodiment.

A process shown in FIG. 3 may be executed, for example, once a day or be initiated when a rule information setter 404 loads a design rule management program for generating rule relationships.

Before the process is started, shape rule data sent from the CAD system 401 to the rule management apparatus 1 is stored in the shape rule DB107 in the rule management apparatus. Similarly, analysis rule data sent from the analysis program 402 to the rule management apparatus 1 is stored in the analysis rule DB 108, and analysis control rule data sent from the analysis control program 403 to the rule management apparatus 1 is stored in the analysis control rule DB 109.

Then, the shape rule data processing unit 101 acquires the shape rule data from the shape rule DB107 and converts the acquired shape rule data into data having an node data format (S101).

The analysis rule data processing unit 102 then acquires analysis rule data from the analysis rule DB 108 and converts the acquired analysis rule data into data having the node data format (S102).

The analysis control rule data processing unit 103 then acquires analysis control rule data from the analysis control rule DB 109 and converts the analysis control rule data into data having the node data format (S103).

The shape rule data, the analysis rule data and the analysis control rule data will be collectively referred to as "rule data", and the design rule data which have been converted into data having the node data format will be referred to as "rule node data" for convenience of explanation.

It is to be understood that the processes from steps S101 to S103 do not have to be executed in the described order.

All the processes of the steps S101 to S103 do not have to be executed, and the embodiment can be realized if at lease one of the processes is executed.

In the steps S101 to S103, the shape rule data processing unit 101, the analysis rule data processing unit 102 and the analysis control rule data processing unit 103 also perform processing to set "rule" for a node type of each of the acquired rule data and assign a node ID (rule ID) to each of the acquired rule data. A related node ID and relationship strength are left blank at these steps.

The rule management apparatus 1 also acquires part data and attribute data from the CAD system 401 and the like in parallel with the steps S101 to S103 and converts the acquired part data and attribute data into data having the node data format similarly to the processing in the steps S101 to S103 (this process is not shown). The part data and attribute data that are converted into data having the node data format are respectively referred to as part node data and attribute node data.

Next, a rule data collecting unit 104 acquires the rule node data from the shape rule data processing unit, the analysis rule data processing unit, the analysis control rule data processing unit (S104).

Then, the rule relationship generation unit 105 detects a relationship between rule node data and rule node data, part node data or attribute node data and stores the detected relationship in the integrating rule DB 300 after describing the detected relationship in the rule node data (S105).

To be more specific, the processing describes the related node ID and the relationship strength which are left blank in the rule node data which has been converted into data having the node data format at the processes of steps S101 to S103, and then stores in the integrating rule DB 300 the rule node data in which the related node ID and the relationship strength are written. Details of step S105 (detection of the relationship) are explained with reference to FIG. 4.

Then, a rule relationship editing unit 106 displays a result of the process of step S105 on a displaying unit not shown and stores in the integrating rule DB 300 rule node data which is modified as needed (S106). The process of step S106 is explained with reference to FIG. 5.

Figure 4:
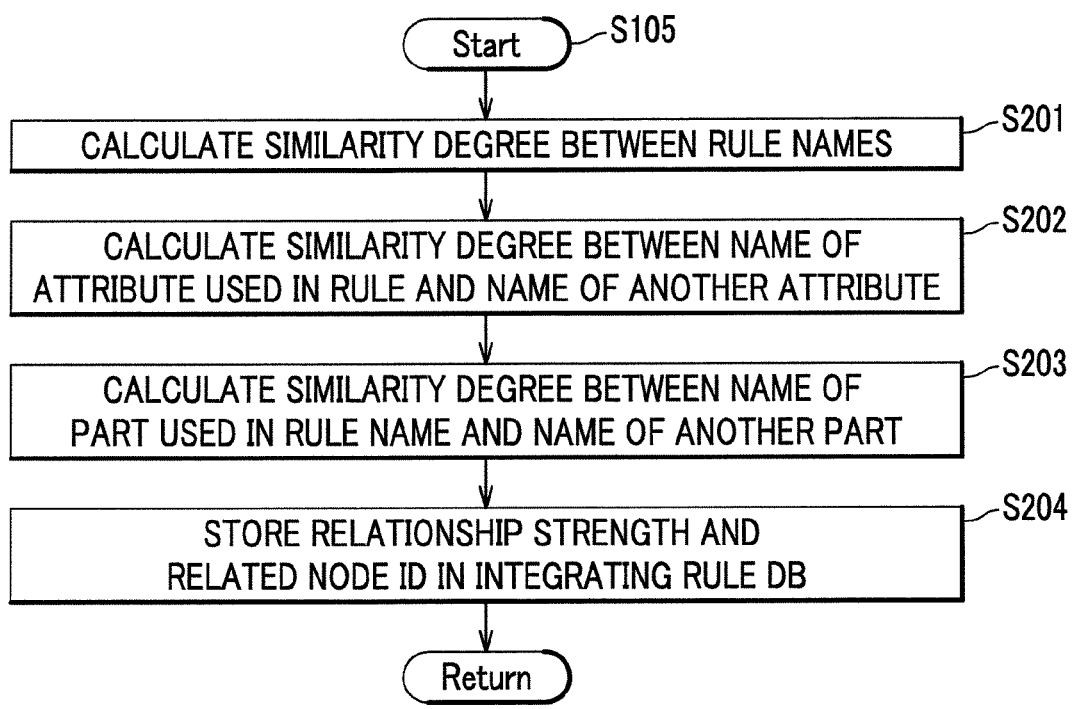
FIG. 4 is a flow chart showing a process of step S105 in FIG. 3.

FIG. 4 is a flow chart showing the process of the step S105 in FIG. 3.

At first, the rule relationship generation unit 105 calculates the similarity degree between rule names (S201). To be more specific, the rule relationship generation unit 105 acquires a rule name on the basis of the rule ID of the rule node data acquired at the step S104 referring to the shape rule DB107, the analysis rule DB 108 and the analysis control rule DB 109. Then, the rule relationship generation unit 105 searches for a rule ID of rule node data which has the same rule name as the rule name, referring to the shape rule DB 107, the analysis rule DB 108 and the analysis control rule data DB 109. When the rule ID is detected, the rule relationship generation unit 105 sets the similarity degree between these rule data to be 1.0 and acquires the detected rule ID. When the rule ID is not detected, the rule relationship generation unit 105 searches for a rule ID of rule data having a rule name similar to the rule name, referring to the thesaurus 110. When the rule ID is detected, the rule relationship generation unit 105 calculates the similarity degree between the rule data according to a predetermined rule, and acquires the detected rule ID. When the rule ID is not detected, the relationship generation unit 105 sets the similarity degree to be 0, and leave the related node ID blank.

Then, the rule relationship generation unit 105 calculates the similarity degree between a name of an attribute used in the rule and a name of another attribute, which is an input and output parameter of rule data, by using the thesaurus 110 similarly to step S201 (S202). Attribute node data and names of attributes are stored in an attribute DB not shown. The rule relationship generation unit 105 searches for the name of the attribute stored in the attribute DB and acquires the attribute ID of the attribute.

Then, by using the thesaurus 110, similarly to the step S201, the rule relationship generation unit 105 calculates the similarity degree between a name of a part used in the rule and a name of another part to which an attribute, which is the input and output parameter of rule data, pertains to (S203). Part node data and names of parts are stored in a part DB not shown. The rule relationship generation unit 105 refers to the part DB to acquire the name of the part, and then calculates the similarity degree between the name of the part used in the rule and the name of the part which has been acquired. Then, the rule relationship generation unit 105 acquires the part ID of the acquired part for which the similarity degree is calculated.

Then, the value of the similarity degree is assigned to the relationship strength, for example. After that, the rule relationship generation unit 105 assigns to the related node ID the rule ID, the attribute ID or the part ID of the rule, attribute or part that are determined to have similar names as the names of the rule, attribute or part for which similar rule, attribute and part are searched for, and stores the related node ID and the relationship strength in the integrating rule DB 300 (S204). In step S204, the rule relationship generation unit 105 generates rule node data for each of the acquired rule ID, attribute ID and part ID.

Figure 5:
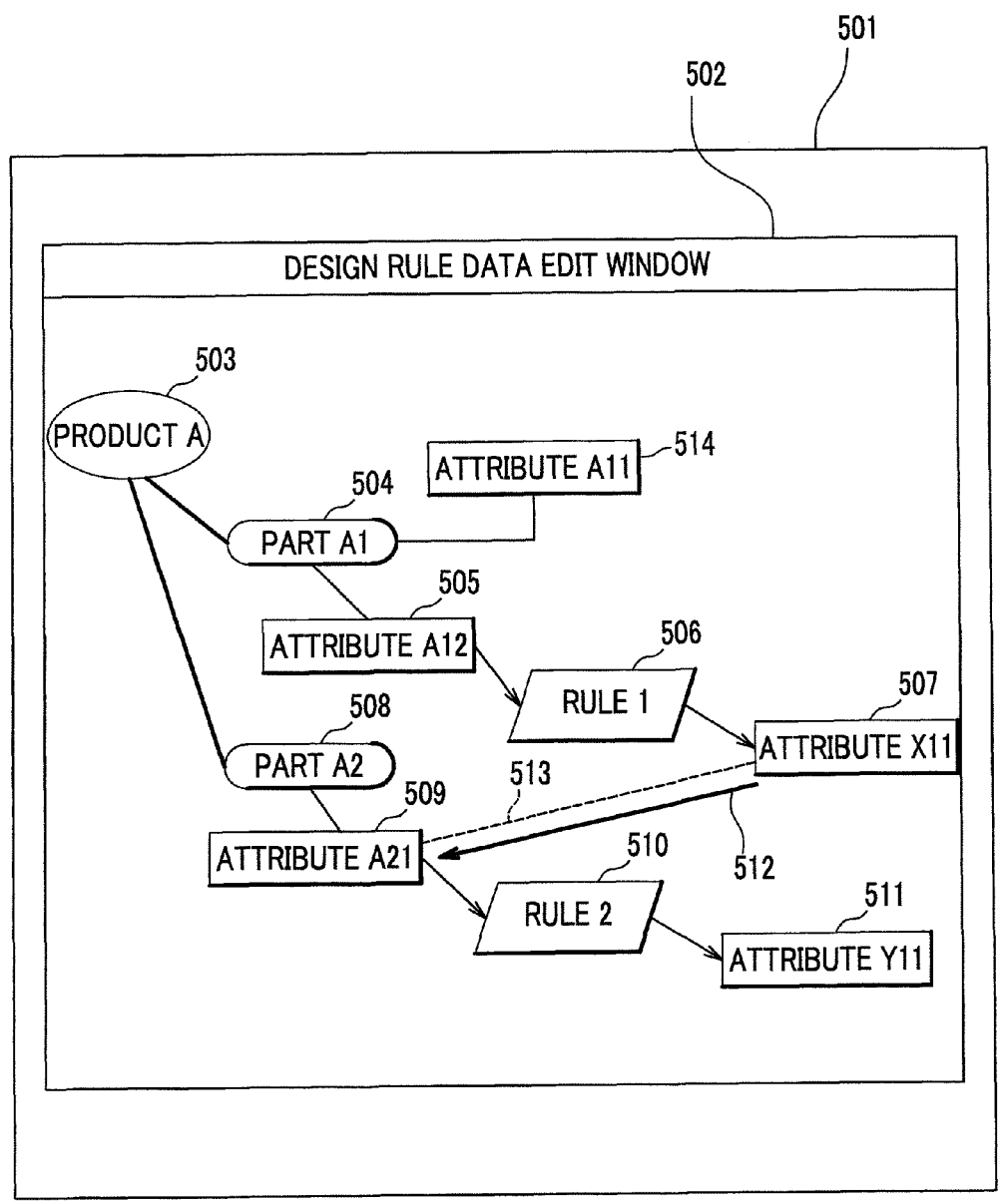
FIG. 5 is an example of a rule editing screen.

FIG. 5 is an example of a rule editing screen 502.

A rule editing screen 501 is a screen which is displayed in the process of step S106 in FIG. 3.

The rule editing screen 501 includes a design rule data edit window.

A product node 503, part nodes 504, 508, attribute nodes 505, 507, 509, 511, 514 and rule nodes 506, 510 are displayed in the hierarchical node format in the design rule data edit window 502.

A product name and part name are respectively displayed in the product node 503 and the part nodes 504, 508.

Attribute information on parts which are linked to the attribute nodes 505, 507, 509, 511, 514 are displayed in the attribute nodes 505, 507, 509, 511, 514. For example, displayed in the attribute nodes 505, 514 are "ATTRIBUTE A12" and "ATTRIBUTE A11" which are attribute information on "PART A1" shown in the part node 504. Displayed in the attribute node 509 is "ATTRIBUTE A21" which is attribute information on "PART A21" shown in the part node 508. The attribute nodes 507 and 511 are explained later. The attribute information displayed in the attribute nodes 505, 507, 509, 511, 514 are attribute information on a shape such as a size and a length obtained from the CAD system 401 and information of an analysis result obtained from the analysis program 402.

Rule names corresponding to the rule IDs of rule node data are respectively displayed in the rule nodes 506, 510. Displayed in the attribute node 507 is an "ATTRIBUTE X11" which is a result of applying the "ATTRIBUTE A12" to a rule formula of a "RULE 1" shown in the rule node 506. Displayed in the attribute node 511 is an "ATTRIBUTE Y11" which is a result of applying the "ATTRIBUTE A21" to a rule formula of a "RULE 2" shown in the rule node 510.

Nodes which are related to each other (nodes which have a value more than 0 in the relationship strength between the nodes) are connected by a link line. Link lines between a part node and an attribute node or an attribute node and a rule node are shown in full lines, whereas link lines between attribute nodes are shown in dash lines (e.g. dash line 513). The thickness or color of these link lines may be changed depending on the value of the relationship strength.

If a rule information provider determines that attributes displayed in two attribute nodes are the same (equal value), the rule information provider drags one of the attribute nodes to the other one of the attribute nodes by using a mouse and the like. (Arrow 512)

When this operation is performed, the rule relationship editing unit 106 of the rule management apparatus 1 sets the relationship strength between a rule node which is linked to one of the two attribute nodes and a rule node which is linked to the other one of the two attribute nodes to be 1.0. To be more specific, the rule relationship editing unit 106 acquires from the integrating rule DB 300 rule node data having as the related node ID an attribute ID shown in the attribute node to which the attribute node is dragged, and generates rule node data having as the related node ID the rule ID of the acquired rule node data and the relationship strength of 1.0. Then, the rule relationship editing unit 106 stores the generated rule node data in the integrating rule DB 300.

In accordance with the process, it is possible to assign the value of 1.0 to the relationship strength between rule nodes to which the value of 1.0 has not been assigned at the step S104.

<Rule Verification Process>

Figure 6:
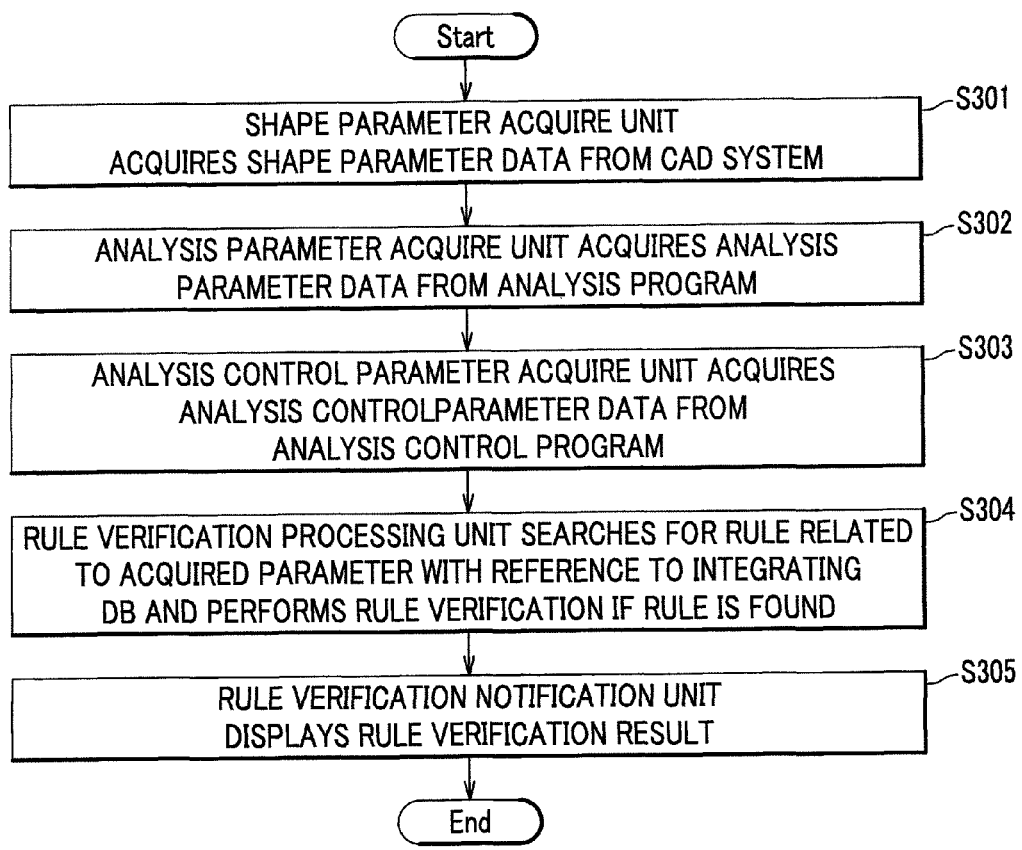
FIG. 6 is a flow chart showing a process in the rule verification apparatus according to the embodiment.

A rule verification process according to the embodiment is now described referring to FIG. 6 and FIG. 7.

FIG. 6 is a flow chart showing a process in a rule verification apparatus according to the embodiment.

The process shown in FIG. 6 is initiated when the user 405 starts a design rule management program for a rule verification.

If, for example, the user 405 changes CAD data in the CAD system 401, or changes a parameter of the analysis program 402 or a parameter of the analysis control program 403 and executes the analysis program 402 or the analysis control program 403, shape parameter data, analysis parameter data and analysis control parameter data are changed accordingly. Then, the shape parameter acquire unit 201 acquires the changed shape parameter data from the CAD system 401 (S301), the analysis parameter acquire unit 202 acquires the changed analysis parameter data from the analysis program 402 (S302) and then the analysis control parameter acquire unit 203 acquires the changed analysis control parameter data from the analysis control program 403 (S303).

It is to be understood that the processes of steps S301 to S303 are not necessarily executed in the above described order.

All the processes of the steps S301 to S303 does not have to be executed, and the embodiment can be realized if at least one of the processes is executed.

Next, the rule verification processing unit 204 searches for a rule which is related to the changed parameter data with reference to the integrating rule DB 300, and performs a rule verification if the rule is detected (S304).

More specifically, the rule verification processing unit 204 acquires all rule node data which are related to the changed parameter based on a parameter ID (attribute ID) contained in the acquired parameter with reference to the integrating rule DB 300. Then, the rule verification processing unit 204 acquires from the acquired rule node data a related node ID of which relationship strength is 1.0, and further acquires the node ID of the node data indicated by the related ID and having "rule" in the node type (i.e. rule ID). Then, the rule verification processing unit 204 searches in a rule DB not shown and acquires all rule formulas corresponding to the rule IDs. The rule DB stores rule IDs, rule names, and rule formulas in a way that the rule ID, the rule names, and the rule formulas are related to each other. Then, the rule verification processing unit 204 performs the rule verification by applying the value of the acquired parameter to all the rule formulas which have been acquired.

After that, the rule verification result notification unit 205 displays a rule verification result which is the result of step S304 (S305). A rule verification result screen which shows the rule verification result at step S305 is described below with reference to FIG. 7.

Figure 7A:
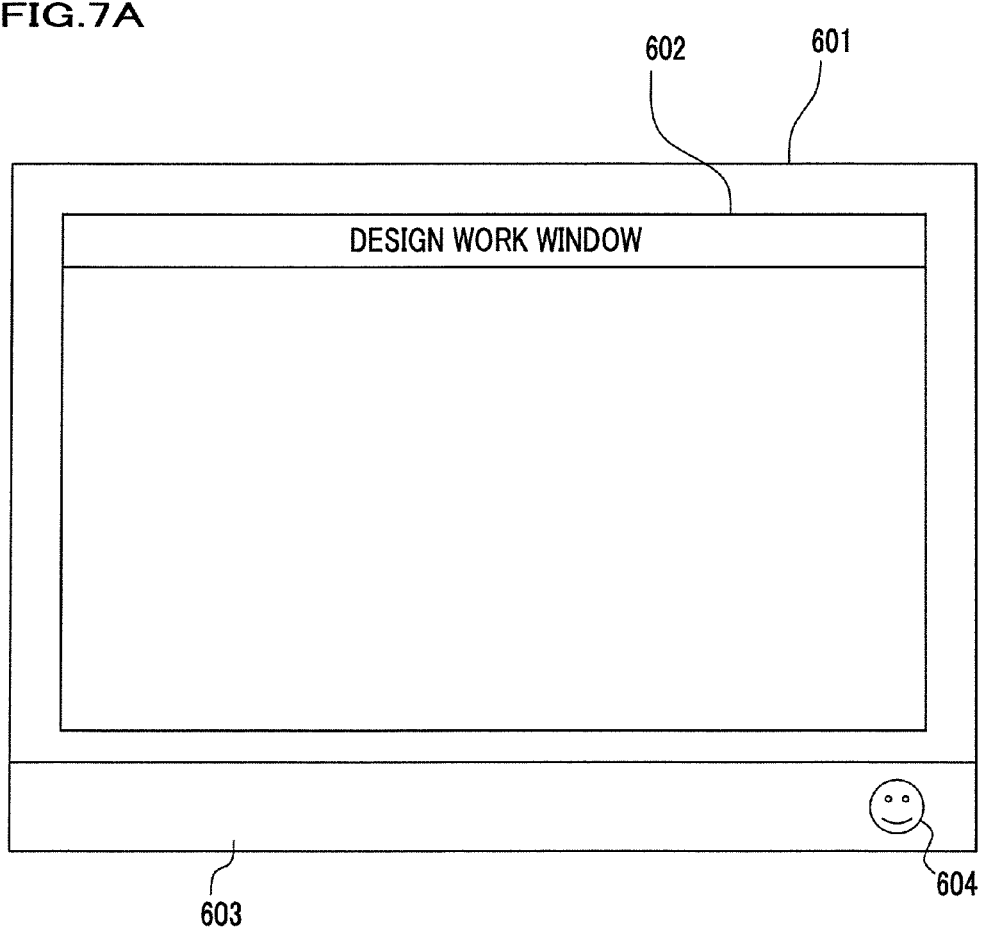
FIG. 7A is an illustration showing an overall view of the rule verification result screen.
Figure 7B:
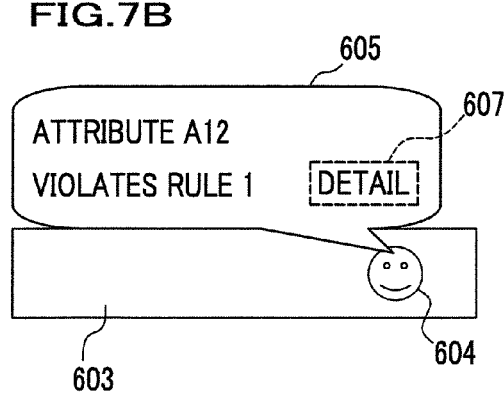
FIG. 7B is an example of an icon which appears when some parameter violates a rule.
Figure 7C:
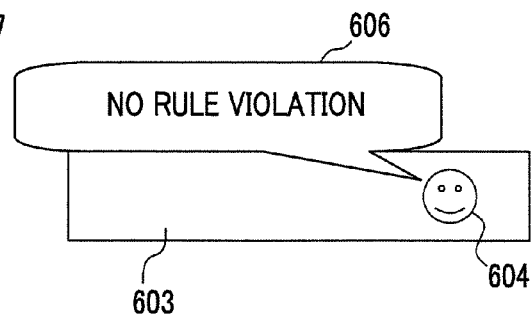
FIG. 7C is an example of an icon which appears when no parameter violates any rule.

FIG. 7 is an example of the rule verification result screen shown at step S305 in FIG. 6. FIG. 7A is an illustration showing an overall view of the rule verification result screen; FIG. 7B is an example of an icon which appears when some parameter violates one of the rules; and FIG. 7C is an example of an icon which appears when no parameter violates any rule.

In FIGS. 7A to 7C, similar numerals are assigned to common elements, and the description thereof will be omitted.

As seen in FIG. 7A, the rule verification result screen 601 includes a design work window 602 showing a work screen for each system and a task bar 603 at the bottom of the rule verification result screen 601. In addition, a rule verification agent 604, which is a resident program, is displayed as an icon in the task bar 603.

The rule verification result screen 601 is a screen displayed on a display unit, not shown, of the rule verification apparatus 2.

Systems such as the CAD system 401 and the analysis program 402 and the like send a parameter to the rule verification apparatus 2 whenever necessary while the systems are executed. The rule verification agent 604 monitors the parameter sent from the systems. When the rule verification agent 604 detects a change of the parameter, the rule verification agent 604 launches a rule verification program, and the rule verification apparatus 2 performs a rule verification by executing the processes of step S301 to S305 shown in FIG. 6.

When a rule violation is detected in the rule verification, the rule verification agent 604 notifies the rule verification result of a client computer as a message shown in FIG. 7B. To be more specific, the rule verification agent 604 displays a message box 605 which is like a speech balloon and a message as shown in FIG. 7B. A "Detail" button 607 for showing detailed error information is displayed in the message box 605, and clicking the "Detail" button 607 with a mouse and the like displays the detailed error information.

If the rule violation is resolved or the rule violation is not detected when the rule verification is performed, a message in a message box 606 shown in FIG. 7C is displayed.

"Rest mode" may be provided with the rule verification agent 604 to stop each system from sending a parameter to the rule verification apparatus 2.

The rule verification at step S304 may not be completed in the rule verification processing unit 204 but the rule verification may be continued by returning a rule verification result and a parameter in question to each system and making each system send a parameter which is modified to the rule verification processing unit 204.

For example, the CAD system 401 to which the rule verification result and the parameter is returned highlights a part where the rule violation occurs. Then, the user 405 changes a shape parameter at the highlighted part and send the changed shape parameter to the rule verification apparatus 2. After that, the rule verification processing unit 204 of the rule verification apparatus 2 performs the rule verification on the sent shape parameter. This process may be repeated until no rule violation occurs.

Moreover, each system may search for other parameters that are affected by the returned parameter and highlight the affected parameters.

Figure 8:
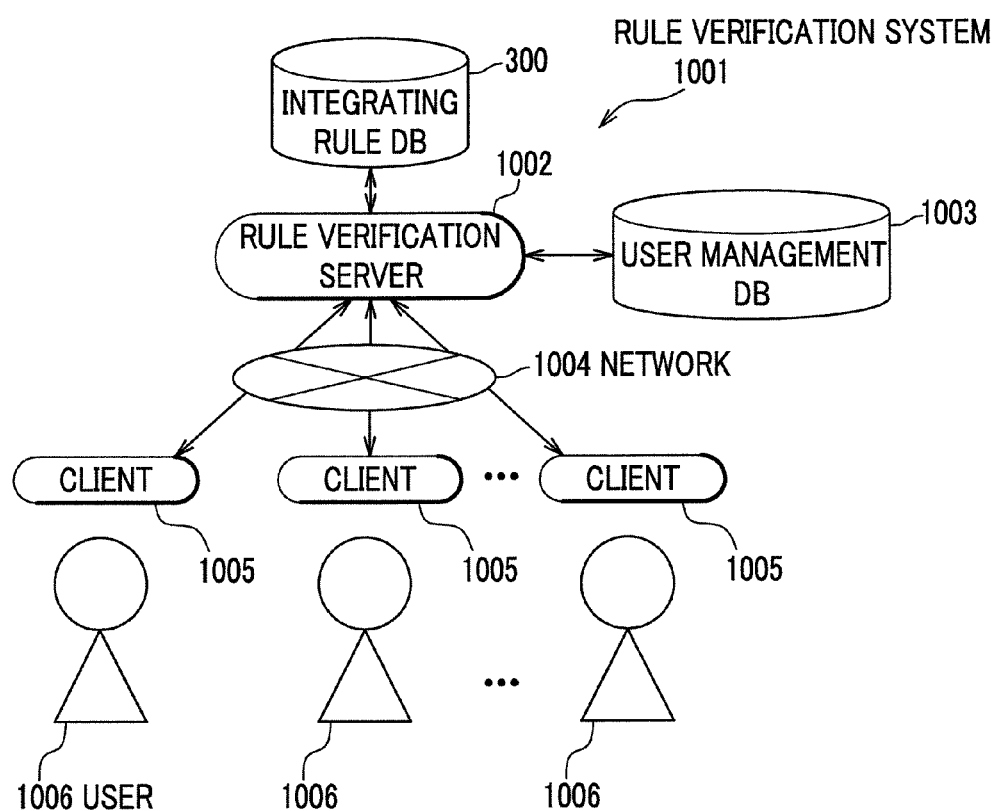
FIG. 8 is a configuration example of a rule verification system according to the embodiment.

FIG. 8 is a configuration example of a rule verification system according to the embodiment.

A rule verification system 1001 includes the integrating rule DB 300, a rule verification server 1002, a user management DB 1003 and at least one client terminal (client 1005). The client 1005 and the rule verification server 1002 are connected via a network 1004 which is a LAN (Local Area Network) or a WAN (Wide Area Network).

The rule verification server 1002 differs from the rule verification apparatus 2 shown in FIG. 2 in that the integrating rule DB 300 is an external apparatus, the rule verification result notification unit 205 has a function of sending the rule verification result to the client 1005 via the network 1004, but the functions and processes of the other parts 201 to 204 (refer to FIG. 2) are the same.

The user management DB 1003 stores information of a user 1006 (e.g. the MAC (Media Access Control) address of the client 1005 the user 1006 uses and a password used when the user 1006 accesses the rule verification server 1002).

The client 1005 has functions of receiving a rule verification result performed at the rule verification server 1002 via the network 1004 and displaying the check result to show the result to the user 1006. The client 1005 may also have a function of the CAD system 401, the analysis program 402 and the analysis control program 403 shown in FIG. 2.

In FIG. 8, the integrating rule DB 300 and the user management DB 1003 are implemented in an apparatus other than the rule verification server 1002, however, these DB 300 and 1003 may be incorporated in the rule verification server 1002.

In the rule verification system 1001 shown in FIG. 8, the rule verification result screen 601 shown in FIG. 7 is displayed on a screen of the client 1005.

The rule verification result screen 601 in the rule verification system 1001 shown in FIG. 8 is described below with reference to FIG. 7.

It is assumed that systems such as the CAD system 401 and the analysis program 402 and the like are implemented in the client 1005 in this example. Description of a case where the systems are implemented in an apparatus other than the client 1005 is the same as the description made referring to FIG. 7 except that the apparatus and the client 1005 transmits and receives necessary information via the rule verification server 1002, and thus the description thereof will be omitted.

While the systems such as the CAD system 401, the analysis program 402 and the like are performed in the client 1005, the rule verification agent 604 monitors parameters used in the systems. If one of the parameters is changed, the client 1005 sends the changed parameter to the rule verification server 1002. Then, the rule verification server 1002 performs the rule verification, and if a rule violation is detected, the rule verification result notification unit 205 of the rule verification server 1002 (refer to FIG. 2) notifies a rule verification result of the client 1005 as a message. The rule verification agent 604 receives the message from the server and displays the message box 605 which is like a speech balloon shown in FIG. 7B and the message.

When the rule violation is resolved or no rule violation is detected when the rule verification is performed, the rule verification result notification unit 205 (refer to FIG. 2) of the rule verification server 1002 notifies the rule verification result of the client 1005 as a message. Then, the client 1005 displays the message shown in FIG. 7C in the message box 606.

In accordance with the present invention, it is possible to recognize the design rules which are substantially the same but described as different design rules in different systems as the same design rule. Thus, it is no more necessary to perform a rule verification in each system when a parameter is changed in a different system.

The embodiments according to the present invention have been explained as aforementioned. However, the embodiments of the present invention are not limited to those explanations, and those skilled in the art ascertain the essential characteristics of the present invention and cam make the various modifications and variations to the present invention to adapt it to various usages and conditions without departing from the spirit and scope of the claims.

What is claimed is:

1. A design rule management method implemented in a rule verification apparatus for checking a violation against a design rule which specifies a part shape when there is any change in parameters in a system,
    the rule verification apparatus comprising:
    a processing unit for processing information;
    an input unit for inputting information; and
    a storage unit for storing a first design rule, a second design rule and a relationship strength, indicating the strength of a predetermined relationship between the first and second design rules in association with one another,
    the method allowing the processing unit to perform steps comprising:
    acquiring the changed parameter via the input unit; and
    in a rule verification to determine whether or not there is any violation in the design rules that specify the part shape and that use the changed parameter, acquiring from the storage unit all the design rules having the relationship strength of a predetermined value, and performing the rule verification on all the acquired design rules.

2. The method according to claim 1, further comprising:
    displaying, when the acquired parameter violates any one of the design rules, a message indicating a rule violation occurs in the design rule on a displaying unit.

3. The method according to claim 1, wherein the rule verification apparatus is capable of communicating with a client terminal and displays, when the acquired parameter violates any one of the design rules, a message indicating a rule violation occurs in the design rule on a displaying unit of the client terminal.

4. A design rule management program recorded in a non-transitory computer readable recording medium which performs the method according to claim 1.

5. The method according to claim 1, wherein the relationship strength is determined based on a similarity degree between the first design rule and the second design rule.

6. A rule verification apparatus for checking a violation against a design rule which specifies a part shape when there is any change in parameters in a system, the rule verification apparatus comprising:
a processing unit for processing information;
an input unit for inputting information; and
a storage unit for storing a first design rule, a second design rule and a relationship strength, indicating the strength of a predetermined relationship between the first and second design rules in association with one another, wherein
the processing unit:
acquires the parameter which is changed via the input unit;
in a rule verification to determine whether or not there is any violation in the design rules that specify the part shape and that use the changed parameter, acquires from the storage unit all the design rules having a predetermined value in the relationship strength with the design rule using the acquired parameter, and performs a rule verification on all the acquired design rules.

7. The rule verification apparatus according to claim 6, wherein the relationship strength is determined based on a similarity degree between the first design rule and the second design rule.

* * * * *